(12) United States Patent
Zhao et al.

(10) Patent No.: US 11,318,611 B2
(45) Date of Patent: May 3, 2022

(54) MULTI CENTER IMPEDANCE CONTROL

(71) Applicant: FANUC CORPORATION, Yamanashi (JP)

(72) Inventors: Yu Zhao, Union City, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 239 days.

(21) Appl. No.: 16/848,189

(22) Filed: Apr. 14, 2020

(65) Prior Publication Data

US 2021/0316453 A1 Oct. 14, 2021

(51) Int. Cl.
*B25J 9/16* (2006.01)
(52) U.S. Cl.
CPC .......... *B25J 9/1633* (2013.01); *B25J 9/1687* (2013.01); *B25J 9/1694* (2013.01); *B25J 9/1679* (2013.01)
(58) Field of Classification Search
CPC ...... B25J 9/1633; B25J 9/1687; B25J 9/1694; B25J 9/1653; G05B 2219/39338; G05B 2219/40031
See application file for complete search history.

(56) References Cited

U.S. PATENT DOCUMENTS

| | | | |
|---|---|---|---|
| 4,445,273 A | 5/1984 | Van Brussel et al. | |
| 4,621,332 A * | 11/1986 | Sugimoto | B25J 13/085 318/568.17 |
| 4,816,727 A | 3/1989 | Shepard et al. | |
| 8,369,983 B2 | 2/2013 | Sato et al. | |
| 9,102,061 B2 | 8/2015 | Schmirgel et al. | |
| 9,492,925 B2 | 11/2016 | Aiso et al. | |

(Continued)

FOREIGN PATENT DOCUMENTS

KR 101307521 B1 9/2013

OTHER PUBLICATIONS

Albu-Schaffer, Alin, and Gerd Hirzinger. "Cartesian impedance control techniques for torque controlled light-weight robots." Proceedings 2002 IEEE International Conference on Robotics and Automation (Cat. No. 02CH37292). vol 1. IEEE, 2002.

(Continued)

*Primary Examiner* — Robert T Nguyen
*Assistant Examiner* — Dylan M Katz
(74) *Attorney, Agent, or Firm* — John A. Miller; Shumaker, Loop & Kendrick, LLP (57) ABSTRACT

A method for controlling a robot to perform a complex assembly task such as insertion of a component with multiple pins or pegs into a structure with multiple holes. The method uses an impedance controller including multiple reference centers with one set of gain factors. Only translational gain factors are used—one for a spring force and one for a damping force—and no rotational gains. The method computes spring-damping forces from reference center positions and velocities using the gain values, and measures contact force and torque with a sensor coupled between the robot arm and the component being manipulated. The computed spring-damping forces are then summed with the measured contact force and torque, to provide a resultant force and torque at the center of gravity of the component. A new component pose is then computed based on the resultant force and torque using impedance controller calculations.

20 Claims, 5 Drawing Sheets

(56) References Cited

U.S. PATENT DOCUMENTS

| | | |
|---|---|---|
| 9,829,878 B2 | 11/2017 | Shimodaira |
| 10,228,680 B2 | 3/2019 | Chen et al. |
| 10,272,568 B2 | 4/2019 | Tsuzaki |
| 2008/0267737 A1 | 10/2008 | Hatanaka et al. |
| 2014/0277720 A1 | 9/2014 | Izumi et al. |
| 2015/0174760 A1 | 6/2015 | Fukuda et al. |
| 2016/0052135 A1 | 2/2016 | Motoyoshi et al. |
| 2017/0151666 A1* | 6/2017 | Kobayashi ............. B25J 9/1633 |
| 2018/0029234 A1 | 2/2018 | Ueda et al. |
| 2018/0129184 A1 | 5/2018 | Shimodaira et al. |

OTHER PUBLICATIONS

Caccavale, F., Natale, C., Siciliano, B., & Villani, L. (1998). Experiments of spatial impedance control. In Experimental Robotics V (pp. 91-104). Springer, Berlin, Heidelberg.

Fei, Yanqiong, and Xifang Zhao. "Contact and jamming analysis for three dimensional dual peg-in-hole mechanism." Mechanism and machine theory 39.5 (2004): 477-499.

Zhang, Kuangen, et al. "Force control for a rigid dual peg-in-hole assembly." Assembly Automation 37.2 (2017): 200-207.

* cited by examiner

MULTI CENTER IMPEDANCE CONTROL

BACKGROUND

Field

The present disclosure relates to the field of industrial robot motion control and, more particularly, to a method for controlling a robot to perform a complex assembly task such as insertion of a dual-pin component into a dual-hole structure, where the method includes an impedance controller which uses multiple reference centers with one set of gains, adds a spring-damping force calculated from reference center positions and velocities to a measured contact force and torque, and computes a new component pose based on the summation.

Discussion of the Related Art

The use of industrial robots to repeatedly perform a wide range of manufacturing and assembly operations is well known. However, some types of assembly operations—such as installing a car door with two hinge pins onto a car body with two hinge pin holes—are still performed manually, where a machine lifts the weight of the door and a human operator aligns the hinge pins with the holes and lowers the door into place. This type of operation is still often performed manually because robots have difficulty detecting and correcting the complex misalignments that may arise in attempting to simultaneously insert multiple pins into multiple holes.

Prior art techniques for controlling the robot, in applications such as those discussed above, involve an impedance controller using a spring-damper system model with one reference center, and defining two groups of gains—one linear and one angular. The prior art technique then attempts to compare force and torque feedback from the robot to the force and torque calculated from the system model, and adjust the robot position accordingly. However, tuning of the gains in this conventional type of system model is difficult; the angular gain in particular, and its relationship to the linear gain, is unintuitive. Furthermore, a system model which is tuned to one assembly application is not applicable to another application where the part geometries or structural properties are different, so the gains and their relationships must be uniquely determined for each application.

In light of the circumstances described above, there is a need for an improved impedance-based feedback control technique for robots performing alignment-sensitive assembly operations.

SUMMARY

In accordance with the teachings of the present disclosure, a method for controlling a robot to perform a complex assembly task such as insertion of a component with multiple pins or pegs into a structure with multiple holes is disclosed. The method uses an impedance controller including multiple reference centers with one set of gain factors. Only translational gain factors are used—one for a spring force and one for a damping force—and no rotational gains. The method computes spring-damping forces from reference center positions and velocities using the gain values, and measures contact force and torque with a sensor coupled between the robot arm and the component being manipulated. The computed spring-damping forces are then summed with the measured contact force and torque, to provide a resultant force and torque at the center of gravity of the component. A new component pose is then computed based on the resultant force and torque.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to an impedance controller for a robot using multiple reference centers is merely exemplary in nature, and is in no way intended to limit the disclosed devices and techniques or their applications or uses.

It is well known to use industrial robots for a variety of manufacturing and assembly operations. However, some types of assembly operations—such as those where there is a large uncertainty in initial part position, or the assembly operation is sensitive to even minor misalignment of one part relative to the other—are difficult for robots to perform reliably. Examples of these types of assembly operations include plugging an electronic component with multiple pins into a socket on a circuit board, and installing a car door with two hinge pins onto a car body with two hinge pin holes. These types of operations are often still performed manually because robots have difficulty detecting and correcting the complexity stemming from even minor misalignments that may arise in attempting to simultaneously insert multiple pins or pegs into multiple holes.

Figure 1:
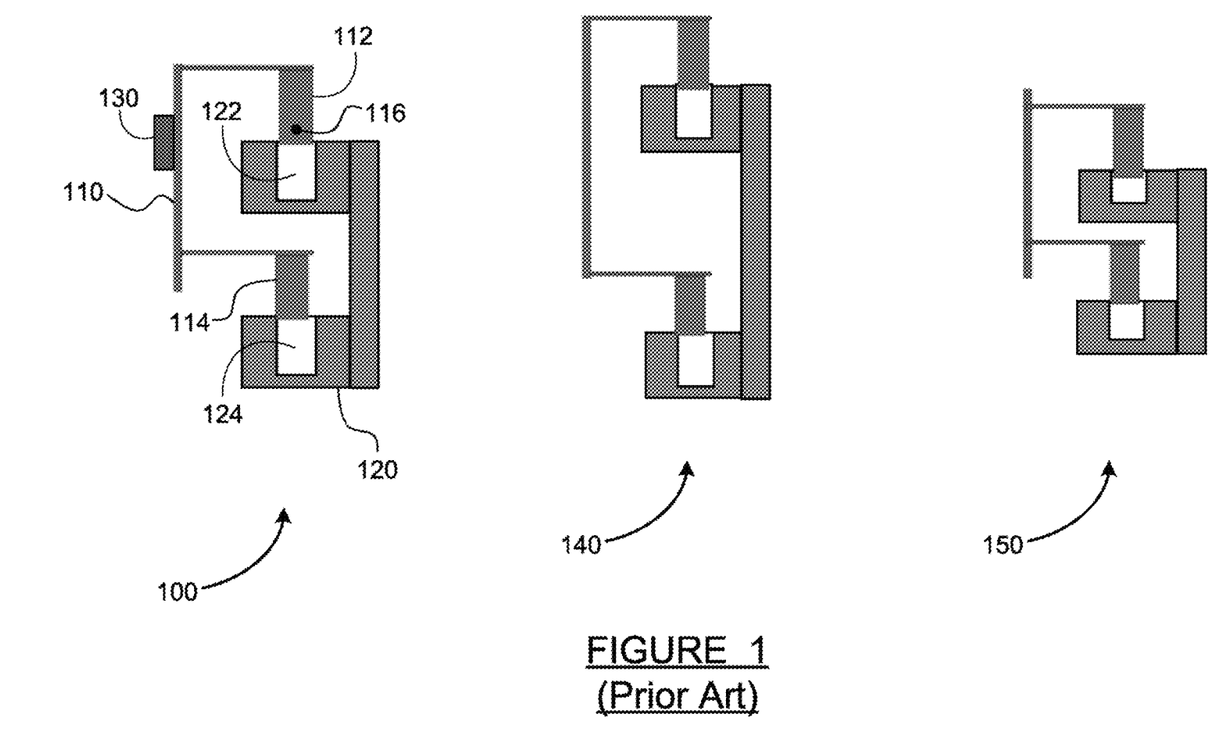
FIG. 1 is an illustration of a two-peg workpiece being installed in a two-hole structure and a conventional single-point impedance controller technique using translational and rotational gains, as known in the art.

FIG. 1 is an illustration of a two-peg workpiece being installed in a two-hole structure and a conventional single-point impedance controller technique using translational and rotational gains, as known in the art. An assembly 100 includes a door 110 and a vehicle body 120. The door 110 includes two vertically-aligned pegs, 112 and 114. The body 120 includes vertically-aligned holes 122 and 124. The job of the robot (not shown in figure) is to manipulate the door 110 to insert the pegs 112 and 114 into the holes 122 and 124, thereby creating a hinge joint connection of the door 110 to the body 120. This assembly operation of course requires the door 110 to be moved so that the tips of the pegs 112 and 114 simultaneously align with and enter the tops of the holes 122 and 124, and then lowering the door 110 so that the pegs 112 and 114 are fully inserted into the holes 122 and 124.

Prior art techniques for controlling the robot, in applications such as the one illustrated in FIG. 1, involve using a spring-damper impedance controller model with one reference point or reference center 116, and defining two groups of gains—one translational and one rotational. The prior art technique then attempts to compare force and torque feedback from a force sensor 130 (coupled between the robot and the door 110) to the force and torque calculated from the spring-damper system model, and adjust the robot position accordingly. However, tuning of the gains in this conventional type of system model is difficult; the rotational gain in particular, and its relationship to the translational gain, is unintuitive. In addition, traditional single reference center impedance controllers can be sensitive to the selection of the location of the reference center 116.

Furthermore, a controller which is tuned to one application, such as the assembly 100, is not applicable to other applications where the part geometries or structural properties are different, so the gains and their relationships must be uniquely determined for each application. For example, if the spring-damper impedance controller has translational and rotational gains tuned to the door installation operation of the assembly 100, the same controller would not be tuned properly for a door installation operation of an assembly 140 where the hinge pegs are spaced further apart, or for a door installation operation of an assembly 150 where the hinge pegs are spaced closer together.

The present disclosure overcomes the limitations of single reference center impedance controllers by providing an impedance controller with multiple reference centers defined at key points. Each reference center in the presently disclosed technique includes only translational spring-damping gains, and the same gain factors are used at all of the reference centers, which simplifies tuning and provides other benefits as discussed below.

Figure 2:
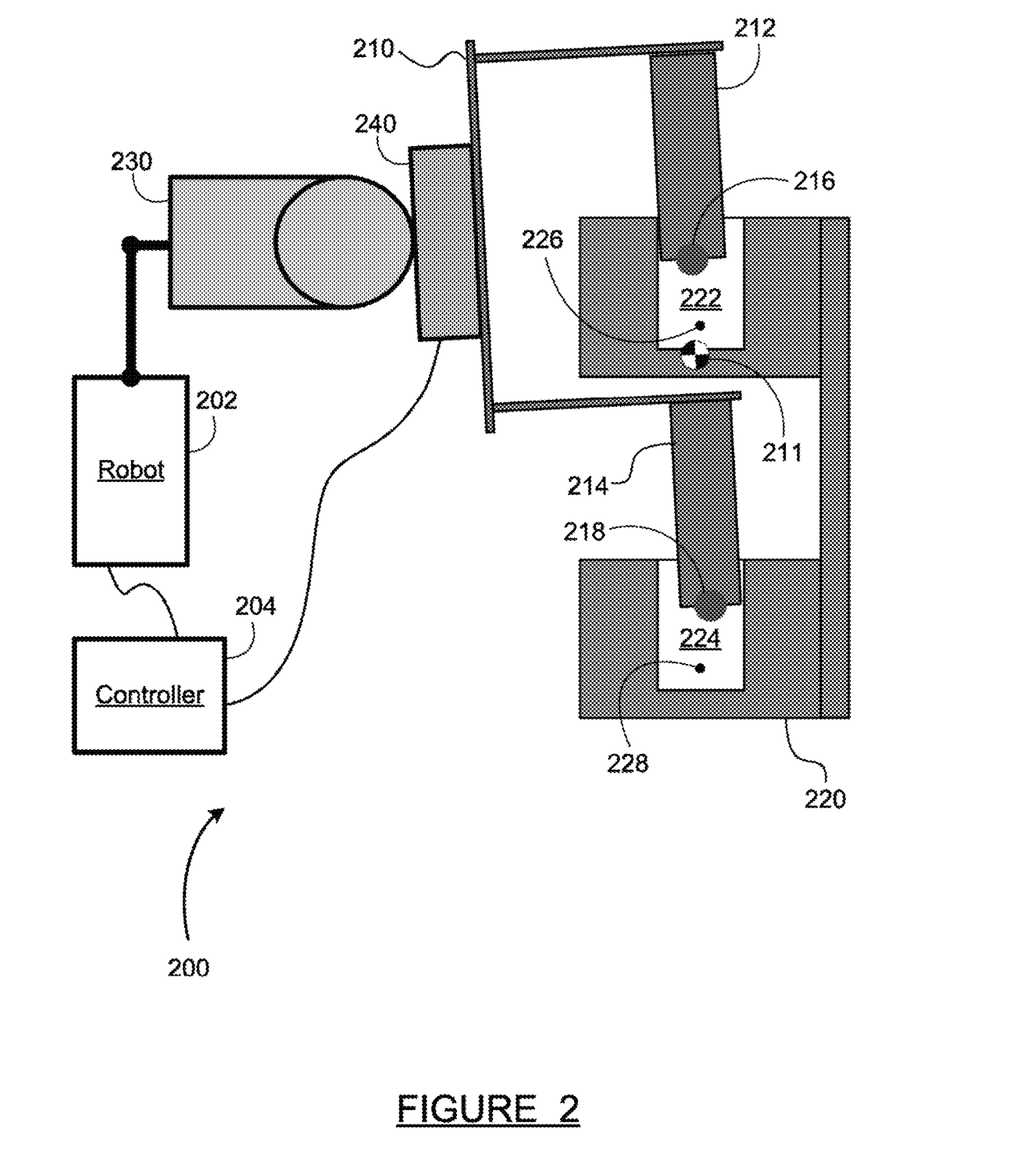
FIG. 2 is an illustration of a two-peg workpiece being installed in a two-hole structure and an impedance controller technique using two reference centers, according to an embodiment of the present disclosure.

FIG. 2 is an illustration of a two-peg workpiece being installed in a two-hole structure and an impedance controller technique using two reference centers, according to an embodiment of the present disclosure. A system 200 includes an industrial robot 202 which is tasked with installing a vehicle door part 210 on a vehicle body 220, similarly to the example discussed earlier and shown in FIG. 1. The robot 202 communicates with a controller 204, typically via a cable but possibly wirelessly, as known in the art. The robot 202 may be a traditional multi-axis articulated industrial robot with arms connected in series at rotational joints (as illustrated in simplified form in FIG. 2), or may be a "delta"-type pick-and-place robot with multiple parallel links, or any other type of robot or machine capable of making specified movements of a workpiece based on instructions from a controller.

It is emphasized that the door assembly operation of FIG. 2 and later figures is merely an example of an assembly operation which is sensitive to even minor misalignments and can benefit from the impedance controller techniques of the present disclosure. Other examples—such as plugging a multi-pin electronic component into a circuit board or other component—can be envisioned by those familiar with robotically-performed assembly operations. Also, FIG. 2 and the following figures are two-dimensional illustrations of the door assembly operation, but it is to be understood that all of the forces, torques, positions and motions described in the following discussion are three-dimensional in nature—including both "in the plane of the page" forces and motions which might be considered to be in the X and Y directions, and "into and out of the page" forces and motions (Z direction).

The door part 210 includes a hinge peg 212 and a hinge peg 214. The door part 210 has a simulated center of gravity 211, which is a point defined based on the center of gravity of the pegs 212 and 214. The body 220 includes a hinge hole 222 and a hinge hole 224. The task of the robot 202 is to manipulate the door part 210 to simultaneously insert the pegs 212 and 214 into the holes 222 and 224, thereby creating a hinge joint connection of the door part 210 to the body 220. A robot arm 230 represents the outer arm and wrist joint of the robot 202, where the arm 230 manipulates the vertical and horizontal positions, and the tilt angle, of the door part 210. A force and torque sensor 240 is coupled between the robot arm 230 and the door part 210, and the sensor 240 provides force and torque signals to the controller 204 via a wired (shown) or wireless connection.

The present disclosure describes an impedance controller technique using multiple reference centers. Impedance control is an approach to dynamic control relating force and position. It is often used in applications where a manipulator interacts with its environment and the force position relation is of concern. Mechanical impedance is the ratio of force output to motion input. A "spring constant" defines the force output for a tension or compression of the spring. A "damping constant" defines the force output for a velocity input. Controlling the impedance of a mechanism means controlling the force of resistance to external motions that are imposed by the environment. Mechanical admittance is the inverse of impedance—it defines the motions that result from a force input. The key theory behind the impedance control method is to treat the environment as an admittance and the manipulator as an impedance. The present disclosure describes an impedance controller method using multiple reference centers, with advantages over prior art methods.

In the system 200, a reference center 216 is defined at a tip of the peg 212, and a reference center 218 is defined at a tip of the peg 214. The impedance controller defines spring-damping forces at each of the reference centers 216 and 218, including a displacement-based spring force and a velocity-based damping force. The spring force at the reference center 216 is computed based on a displacement of the reference center 216 from a target reference point 226 at the bottom center of the hole 222. Likewise, the spring force at the reference center 218 is computed based on a displacement of the reference center 218 from a target reference point 228 at the bottom center of the hole 224.

Following is a discussion of how the spring-damping forces at the reference centers 216 and 218 are calculated in the impedance controller of the present disclosure. The position of the reference center 216 is designated as $p_{216}$, and the position of the reference center 218 is designated as $p_{218}$. The positions $p_{216}$ and $p_{218}$ have three-dimensional (e.g., X, Y and Z) coordinates. The velocity of the reference center 216 is designated as $v_{216}$, and the velocity of the reference center 218 is designated as $v_{218}$. The velocities $v_{216}$ and $v_{218}$ are vectors having three-dimensional (X, Y and Z) components. The positions $p_{216}$ and $p_{218}$ and the velocities $v_{216}$ and $v_{218}$ are calculated by the controller 204 based upon known geometry of the robot 202 including the position and orientation of the arm 230, along with the geometry of the door part 210.

The position of the target reference point 226 is designated as $p_{226}$, and the position of the target reference point 228 is designated as $p_{228}$. The positions $p_{226}$ and $p_{228}$ also have three-dimensional (X, Y and Z) coordinates, where at least the lateral and vertical components are fixed relative to the base of the robot 202. Additionally, while FIG. 2 represents a static image of the parts in the system 200, it should be noted that the techniques of the present disclosure may be applied while the vehicle body 220 is moving along a conveyor, and the longitudinal (Z direction) velocity of the conveyor is factored into the three-dimensional movement of the robot arm 230.

According to the impedance controller of the present disclosure, the spring-damping force at the reference center 216 is calculated as:

$$f_{216}=K_p(p_{226}-p_{216})-D_p(v_{216}) \qquad (1)$$

Likewise, the spring-damping force at the reference center 218 is calculated as:

$$f_{218}=K_p(p_{228}-p_{218})-D_p(v_{218}) \qquad (2)$$

Where $K_p$ is a spring constant or gain factor and $D_p$ is damping constant or gain factor, and the other variables were defined above. The same spring gain factor $K_p$ and the same damping gain factor $D_p$ are used in the spring-damping force calculations for all of the reference centers, and may be determined empirically and fine-tuned as necessary to achieve the best controller results. Because the multi-reference-center impedance controller does not use rotational gain factors, the translational gain factors chosen for a particular application (such as car door installation) are likely to be very effective for other applications of the same type with different part geometry. The use of a single set of gain factors, with no rotational gains, constitutes a major advantage of the present multi-center impedance controller over prior art techniques.

Equation (1) may be explained as follows: the spring force at the reference center 216 is a spring constant multiplied by the displacement (difference in position) of the reference center 216 from the target reference point 226, and the damping force at the reference center 216 (subtracted from the spring force) is a damping constant multiplied by the velocity of the reference center 216. Equation (2) is explained likewise. The spring-damping forces at the reference centers 216 and 218 are three-dimensional force vectors.

Figure 3A:
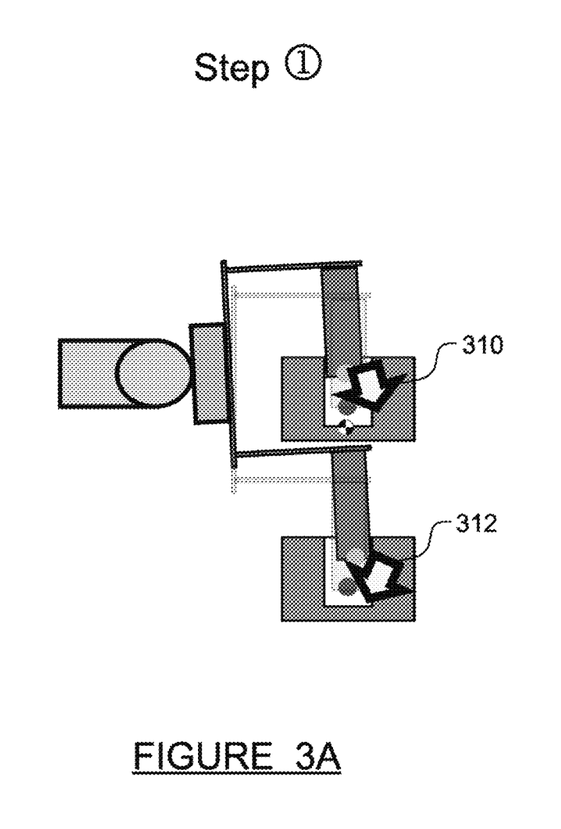
FIGS. 3A, 3B, 3C and 3D are illustrations of the steps involved in execution of the impedance controller technique using two reference centers shown in FIG. 2, according to an embodiment of the present disclosure.

FIGS. 3A, 3B, 3C and 3D are illustrations of the steps involved in execution of the impedance controller technique using two reference centers shown in FIG. 2, according to an embodiment of the present disclosure. FIG. 3A illustrates the first step in the process, which is the calculation of the spring-damping forces at the reference centers 216 and 218 as discussed above. In FIG. 3A, a force vector 310 represents $f_{216}$ (calculated in Equation (1)), and a force vector 312 represents $f_{218}$ (calculated in Equation (2)). The calculation of the spring-damping forces at this first step are performed by the controller 204, based on predefined values of $K_p$ and $D_p$, and the reference center positions and velocities known by the controller 204 as discussed earlier.

Figure 3B:
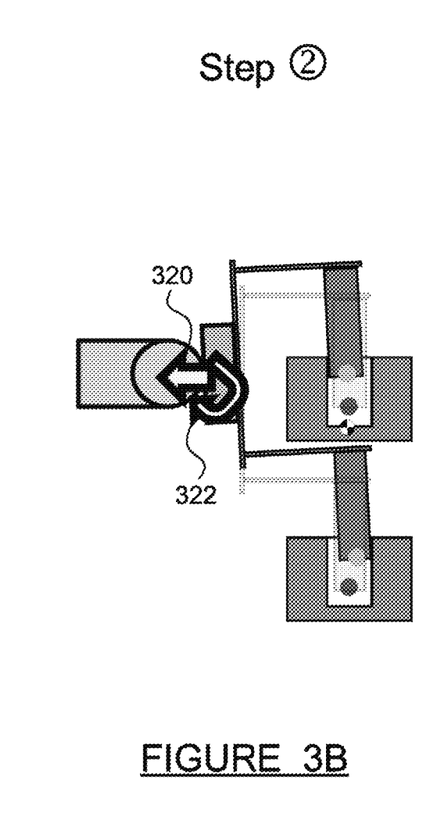

FIG. 3B illustrates the second step in the process, where the combined contact force and torque are measured by the sensor 240. A force vector 320 represents the force measured by the sensor 240, and a torque vector 322 represents the torque measured by the sensor 240. The force vector 320 and the torque vector 322 indicate the force and torque, respectively, applied on the robot arm 230 by the door part 210. The values of the force vector 320 and the torque vector 322 are provided as sensor signals from the sensor 240 to the controller 204.

Figure 3C:
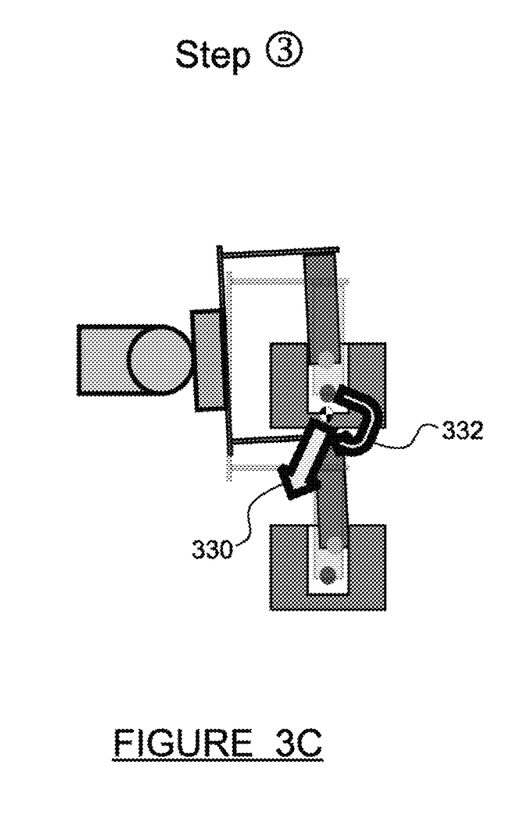

FIG. 3C illustrates the third step in the process, where the controller 204 calculates the sum of the spring-damping forces at the reference centers 216 and 218 (from FIG. 3A) and the contact force and torque measured by the sensor 240 (from FIG. 3B). The summation of the force vectors and the torque about the center of gravity 211 yield a resultant force vector 330 and a resultant torque vector 332 applied at the center of gravity 211.

Figure 3D:
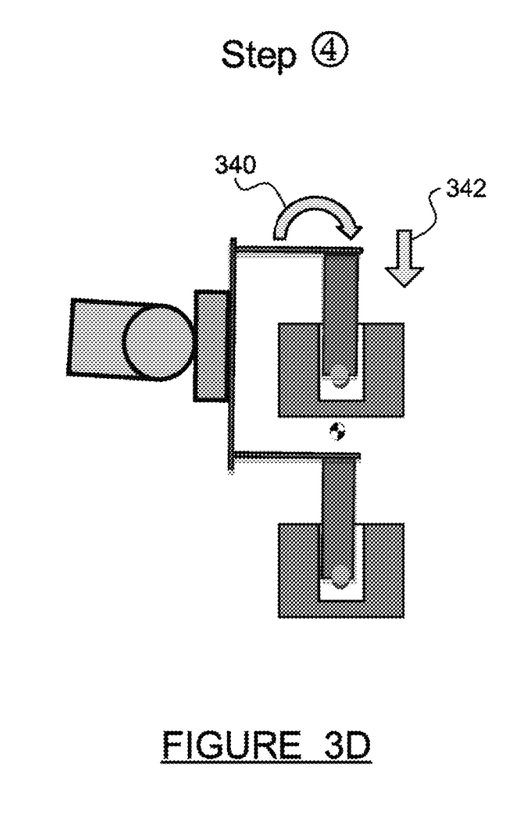

FIG. 3D illustrates the fourth step in the process, where the controller 204 calculates a new pose of the door part 210 under the force and torque from the third step (the resultant force vector 330 and the resultant torque vector 332). Using known impedance controller techniques, the controller 204 solves an equation of the type used for a spring-mass-damper system—that is; $F=ma+Cv+Kx+S$. However, because the spring and damping forces are already included in the computed force F, the equations simplify to $F=ma$ for translational motion and $T=I\alpha$ for rotational motion. Using known mass and inertia properties of the door part 210, the controller 204 determines the motions of the door part 210 which would result from the resultant force vector 330 (F) and the resultant torque vector 332 (T). The controller 204 then moves the robot arm 230 via the robot 202 so that the door part 210 undergoes the motions just calculated. This motion is illustrated in FIG. 3D, where the door part 210 has rotated (arrow 340) to become much more closely aligned with the holes 222 and 224, and translated (arrow 342) to become almost fully inserted into the holes 222 and 224.

The multi-center impedance controller discussed above in reference to the door installation example has several advantages over prior art single-center impedance controllers. First, in the multi-center controller, the selection of reference centers and their corresponding target points is intuitive and straightforward. In the case of inserting a multi-peg component into corresponding holes, the tips of the pegs are easily definable as reference center points. Also, the multi-center controller eliminates the need for rotational gain constants, which are difficult and unintuitive to determine. In addition, one set of spring and damping gain factors are used at all of the (two or more) reference centers, and gain factors used in one application of the multi-center controller are applicable to other applications of a similar part having different geometry.

Figure 4:
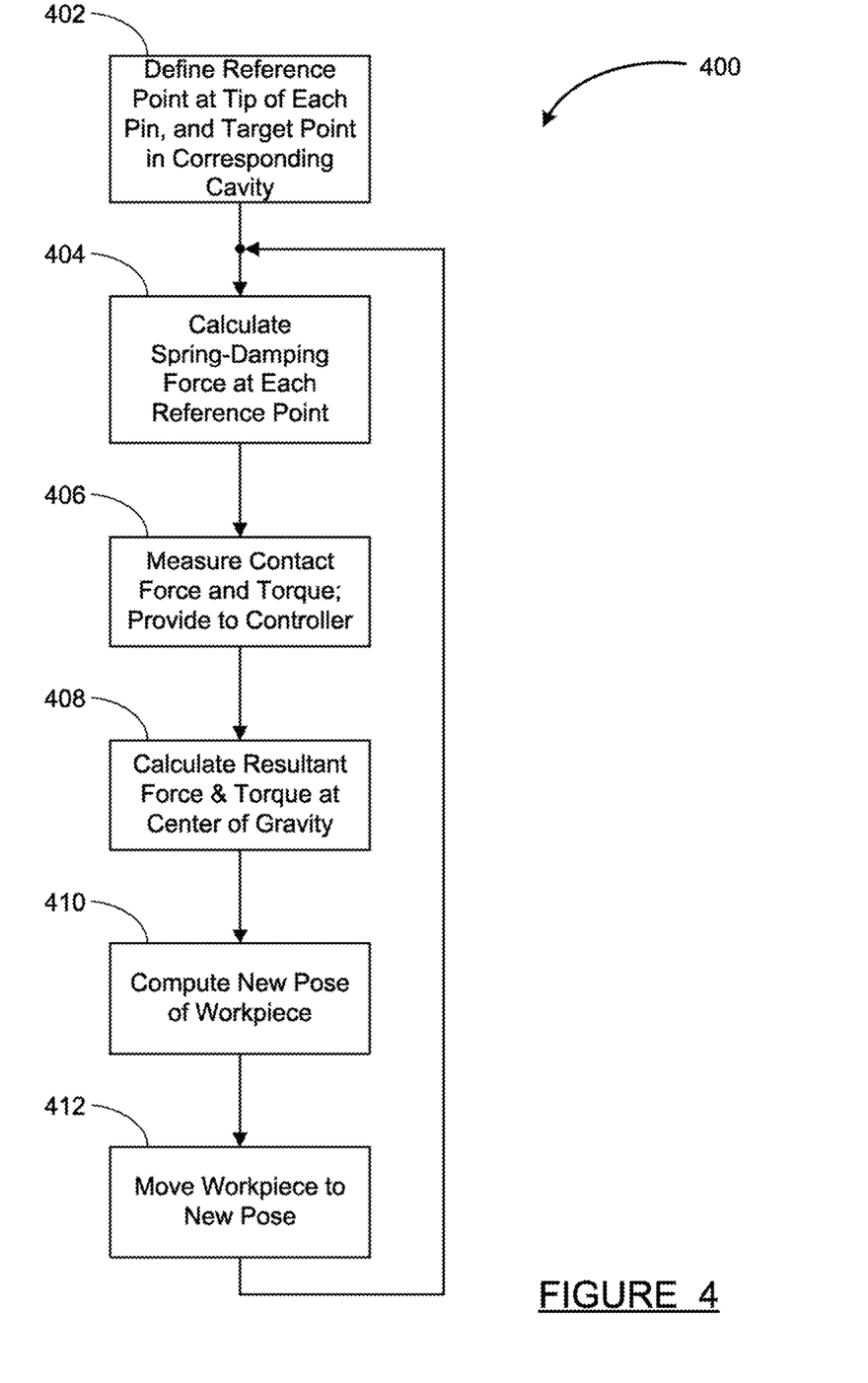
FIG. 4 is a flowchart diagram of a method for controlling a robot performing an assembly task, including a multiple reference center impedance controller, according to an embodiment of the present disclosure.

FIG. 4 is a flowchart diagram 400 of a method for controlling a robot performing an assembly task, including a multiple reference center impedance controller, according to an embodiment of the present disclosure. The assembly operation described in the method of FIG. 4 involves using a robot 202 (with outer robot arm 230) to simultaneously insert a plurality of pins or pegs of a first workpiece 210 into a plurality of cavities of a second workpiece 220, as illustrated in FIGS. 2 and 3. However, as discussed above, the multi-reference-center impedance controller of the present disclosure is applicable to other types of assembly operations as well.

At box 402, a reference point is defined at a tip of each of the pins on the first workpiece 210 and a corresponding target point is defined in a cavity of the second workpiece 220. Each of the pins corresponds with a specific one of the cavities, and the reference point to target point relationships are defined accordingly. At box 404, a spring-damping force at each of the reference points is calculated, by the robot controller 204, based on a velocity of the reference point and a displacement of the reference point with respect to the corresponding target point. Specifically, the spring-damping force at a first reference point is calculated using Equation (1) above, etc. The reference point positions and velocities are known by the controller 204 based on robot kinematics and workpiece geometry. The spring gain factor $K_p$ and the damping gain factor $D_p$ may be determined empirically and fine-tuned as necessary to achieve the best controller results, and the same spring gain factor and damping gain factor are used in calculating the spring-damping force for each of the reference points.

At box 406, a contact force and torque are measured by the sensor 240 coupled between the robot 202 and the first workpiece 210, and the contact force and torque are communicated to the controller 204. At box 408, a resultant force and torque at the center of gravity 211, as a sum of the spring-damping forces (box 404) and the contact force and torque (box 406), are calculated by the controller 204. The summation of the force vectors 310 and 312, the force vector 320 and the torque 322 about the center of gravity 211 yield the resultant force vector 330 and the resultant torque vector 332 applied at the center of gravity 211.

At box 410, a new pose of the door part 210 is calculated by the controller 204 based on the resultant force 330 and torque 332. The new pose of the door part 210 is calculated using F=ma and T=Ia equations. At box 412, the door part 210 is moved to the new pose (calculated at the box 410) by the robot 202 in response to signals from the controller 204. The impedance controller of the present disclosure is implemented as a real-time feedback control system, meaning that the process continuously loops back to the box 404 to calculate new spring-damping forces after the door part 210 is moved to the new pose at the box 412. The looping continues until the pegs 212 and 214 of the door part 210 are fully seated in the holes 222 and 224 of the vehicle body 220.

Again, to be clear, the preceding discussion directed to a door part with hinge pins being installed into corresponding hinge holes is just an example. The disclosed technique is applicable to any type of workpiece with pins to be simultaneously inserted into corresponding holes, or other types of assembly activities which are sensitive to even minor misalignment.

Throughout the preceding discussion, various computers and controllers are described and implied. It is to be understood that the software applications and modules of these computer and controllers are executed on one or more computing devices having a processor and a memory module. In particular, this includes the processor in the robot controller 204 discussed above. Specifically, the processor in the controller 204 is configured to use the impedance feedback control technique with multiple reference centers in the manner discussed above.

As outlined above, the disclosed techniques for an impedance controller for a robot using multiple reference centers improve the performance of robotic assembly operations where there is a large uncertainty in part position or the assembly operation is sensitive to even minor misalignment of one part relative to the other.

While a number of exemplary aspects and embodiments of the impedance controller for a robot using multiple reference centers have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for controlling a robot performing an assembly operation of inserting a plurality of pins of a first workpiece into a plurality of cavities of a second workpiece, said method comprising:

defining a reference point at a tip of each of the pins on the first workpiece and a corresponding target point for each reference point in a cavity of the second workpiece;

calculating, by a robot controller, a spring-damping force at each of the reference points based on a velocity of the reference point and a displacement of the reference point with respect to the corresponding target point;

measuring a contact force and torque by a sensor coupled between the robot and the first workpiece and communicating the contact force and torque to the controller;

calculating, by the controller, a resultant force and torque as a sum of the spring-damping forces and the contact force and torque;

calculating, by the controller, a new pose of the first workpiece based on the resultant force and torque; and moving the first workpiece to the new pose by the robot in response to signals from the controller.

2. The method according to claim 1 wherein a single damping gain factor and a single spring gain factor are used in calculating the spring-damping force at all of the reference points.

3. The method according to claim 2 wherein the damping gain factor and the spring gain factor are translational gain factors, and no rotational gain factors are used in calculating the spring-damping force at the reference points.

4. The method according to claim 2 wherein the spring-damping force at each of the reference points is calculated as the damping gain factor multiplied by the velocity of the reference point plus the spring gain factor multiplied by the displacement of the reference point with respect to the corresponding target point.

5. The method according to claim 1 wherein the velocity of the reference points and the displacement of the reference points with respect to the corresponding target points are determined using kinematic calculations based on known robot position and velocity and known geometry of the first workpiece with respect to the robot.

6. The method according to claim 1 wherein calculating a resultant force and torque as a sum of the spring-damping forces and the contact force and torque includes summing all of the spring-damping forces and the contact force and torque about a simulated center of gravity of the first workpiece.

7. The method according to claim 1 wherein calculating a new pose of the first workpiece includes using impedance controller calculations to calculate the new pose of the first workpiece based on the resultant force and torque applied at a simulated center of gravity of the first workpiece.

8. The method according to claim 1 wherein the first workpiece is a vehicle door part and the second workpiece is a vehicle body.

9. The method according to claim 8 wherein the plurality of pins is two hinge pins on the door part and the assembly operation is simultaneously inserting the two hinge pins into two hinge openings on the vehicle body.

10. The method according to claim 8 wherein the vehicle body is moving on a conveyor during the assembly operation, and the robot controller includes motion of the conveyor in the signals to the robot to move the vehicle door part.

11. A method for controlling a robot to install a vehicle door part on a vehicle body by inserting two hinge pins on the door part into two hinge openings on the vehicle body, said method comprising:

defining a reference point at a tip of each of the hinge pins on the door part and a corresponding target point for each reference point in the two hinge openings on the vehicle body;

calculating, by a robot controller, a spring-damping force at each of the reference points based on a velocity of the reference point and a displacement of the reference point with respect to the corresponding target point;

measuring a contact force and torque by a sensor coupled between the robot and the door part and communicating the contact force and torque to the controller;

calculating, by the controller, a resultant force and torque as a sum of the spring-damping forces and the contact force and torque about a center of gravity of the hinge pins on the door part;

calculating, by the controller, a new pose of the door part using an impedance controller calculation based on the resultant force and torque; and moving the door part to the new pose by the robot in response to signals from the controller.

12. The method according to claim 11 wherein one damping gain factor and one spring gain factor are used in calculating the spring-damping force at both of the reference points, the damping gain factor and the spring gain factor are translational gain factors, and the spring-damping force at each of the reference points is calculated as the damping gain factor multiplied by the velocity of the reference point plus the spring gain factor multiplied by the displacement of the reference point with respect to the corresponding target point.

13. A system for performing an assembly operation of inserting a plurality of pins of a first workpiece into a plurality of cavities of a second workpiece, said system comprising:

an industrial robot configured to move the first workpiece;

a force and torque sensor coupled between the first workpiece and the robot; and a robot controller having a processor and memory, said controller being in communication with the robot and receiving signals from the sensor, said controller being configured to perform steps including;

defining a reference point at a tip of each of the pins on the first workpiece and a corresponding target point for each reference point in a cavity of the second workpiece;

calculating a spring-damping force at each of the reference points based on a velocity of the reference point and a displacement of the reference point with respect to the corresponding target point;

calculating a resultant force and torque as a sum of the spring-damping forces and a contact force and torque measured by the sensor;

calculating a new pose of the first workpiece based on the resultant force and torque; and sending signals to the robot causing the robot to move the first workpiece to the new pose.

14. The system according to claim 13 wherein one damping gain factor and one spring gain factor are used in calculating the spring-damping force at all of the reference points, and where the gain factors are translational gain factors.

15. The system according to claim 14 wherein the spring-damping force at each of the reference points is calculated as the damping gain factor multiplied by the velocity of the reference point plus the spring gain factor multiplied by the displacement of the reference point with respect to the corresponding target point.

16. The system according to claim 13 wherein the velocity of the reference points and the displacement of the reference points with respect to the corresponding target points are determined using kinematic calculations based on known robot position and velocity and known geometry of the first workpiece with respect to the robot.

17. The system according to claim 13 wherein calculating a resultant force and torque as a sum of the spring-damping forces and the contact force and torque includes summing all of the spring-damping forces and the contact force and torque about a simulated center of gravity of the first workpiece.

18. The system according to claim 13 wherein calculating a new pose of the first workpiece includes using impedance controller calculations to calculate the new pose of the first workpiece based on the resultant force and torque applied at a simulated center of gravity of the first workpiece.

19. The system according to claim 13 wherein the first workpiece is a vehicle door part and the second workpiece is a vehicle body, and where the plurality of pins is two hinge pins on the door part and the assembly operation is simultaneously inserting the two hinge pins into two hinge openings on the vehicle body.

20. The system according to claim 19 wherein the vehicle body is moving on a conveyor during the assembly operation, and the robot controller includes motion of the conveyor in the signals to the robot to move the vehicle door part.

* * * * *